United States Patent [19]
Bravo

[11] Patent Number: 6,006,773
[45] Date of Patent: *Dec. 28, 1999

[54] INSTALLATION METHOD FOR PIPE LAYOUT WITH OPPOSING INCLINE

[76] Inventor: Sergio M. Bravo, 2872 Tigertail Dr., Los Alamitos, Calif. 90720

[*] Notice: This patent is subject to a terminal disclaimer.

[21] Appl. No.: 08/987,525

[22] Filed: Dec. 9, 1997

Related U.S. Application Data

[63] Continuation-in-part of application No. 08/936,331, Sep. 24, 1997.

[51] Int. Cl.$^6$ .............................. B67D 5/32; F16K 43/00
[52] U.S. Cl. ................................. 137/15; 73/46; 73/49.1; 137/312; 137/315; 141/383; 285/133.21; 285/133.4; 285/379
[58] Field of Search .......................... 137/15, 312, 315; 141/383; 285/133.11, 133.21, 133.3, 133.4, 133.5, 133.6, 379, 410, 412; 73/40.5 R, 46, 49.1; 138/104, 111, 114; 405/52, 53

[56] References Cited

U.S. PATENT DOCUMENTS

| | | |
|---|---|---|
| 3,721,270 | 3/1973 | Wittgenstein ............................ 138/104 |
| 4,842,163 | 6/1989 | Bravo ...................................... 138/104 |
| 4,971,225 | 11/1990 | Bravo ...................................... 405/154 |
| 4,971,477 | 11/1990 | Webb et al. ............................. 405/154 |
| 5,100,024 | 3/1992 | Bravo ........................................ 141/86 |
| 5,257,652 | 11/1993 | Lawrence .................................. 141/86 |
| 5,285,829 | 2/1994 | Bravo ........................................ 141/88 |
| 5,341,857 | 8/1994 | Bravo ........................................ 141/88 |
| 5,527,130 | 6/1996 | Webb ......................................... 405/52 |
| 5,529,098 | 6/1996 | Bravo ........................................ 141/88 |
| 5,590,981 | 1/1997 | Osborne ................................... 405/154 |

Primary Examiner—George L. Walton

[57] ABSTRACT

A T-fitting such as for use inside a containment box for connecting a primary pipeline to a gasoline dispenser has two flanges which connect to the pipeline and a main T-element sealed to each flange by a sealing element such as a gasket. The flanges thread onto each end of the primary pipeline. The main T-element has a stem which is threaded to a pipe leading to a gasoline dispenser. The flanges of the T-element are bolted to the main body of the T-element with the rubber gasket in between to seal the primary pipeline to the T-element. A method for installing a secondary containment system using the T-fitting includes the steps of fastening the stem of the T to the pipe leading to the gasoline dispenser, fastening the flanges of the T-fitting to primary pipeline segments, and fastening the flanges to the main body of the T element.

16 Claims, 9 Drawing Sheets

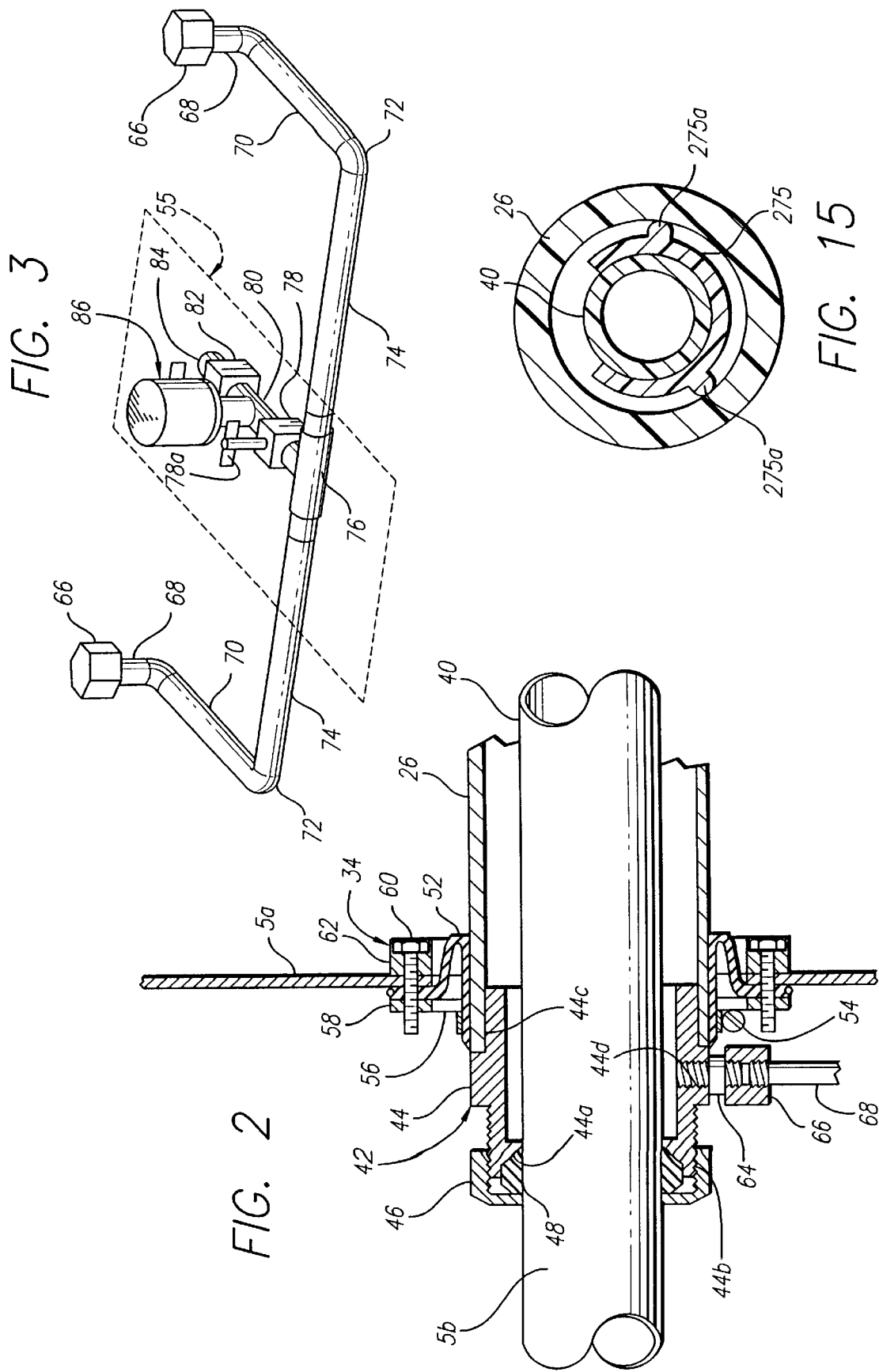

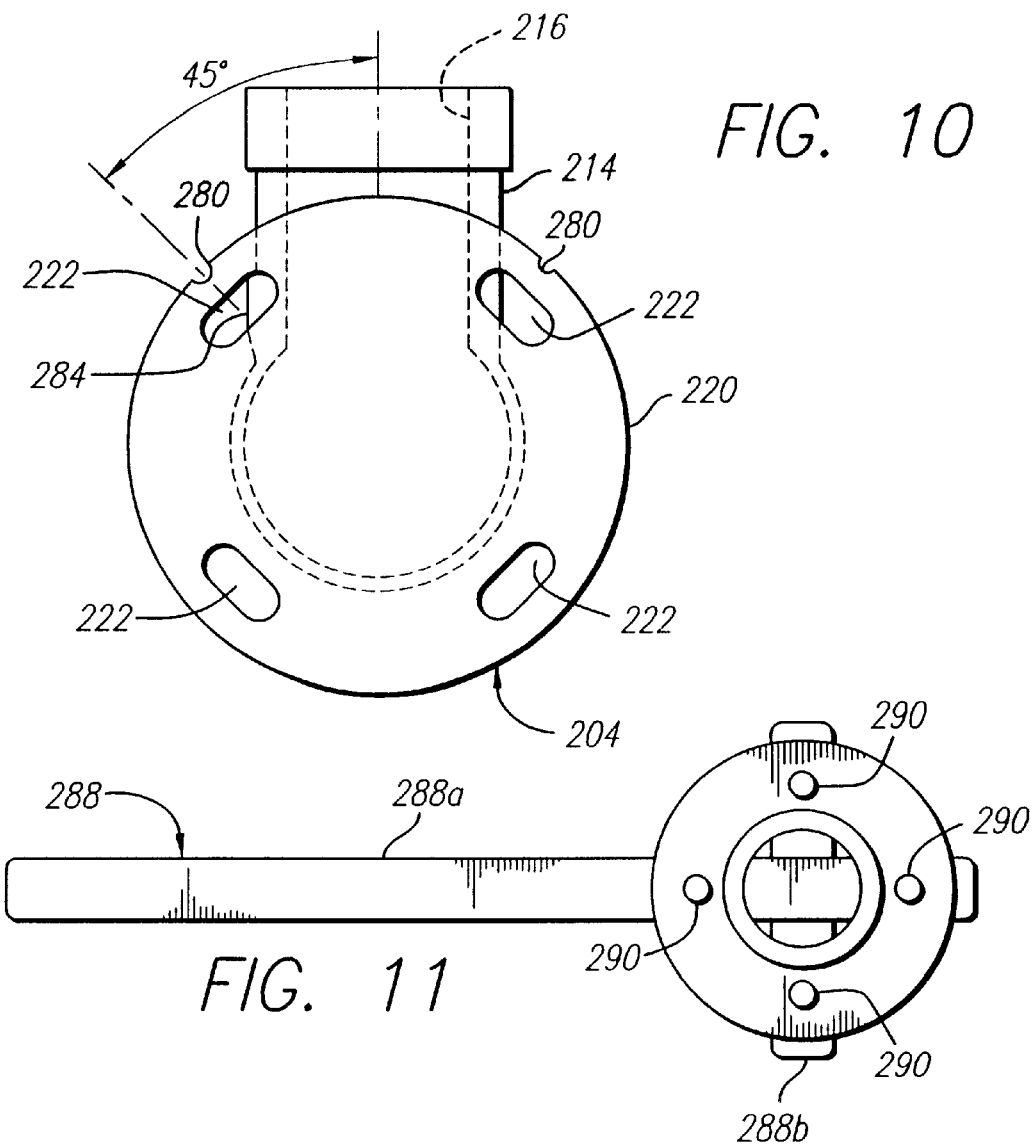
FIG. 10
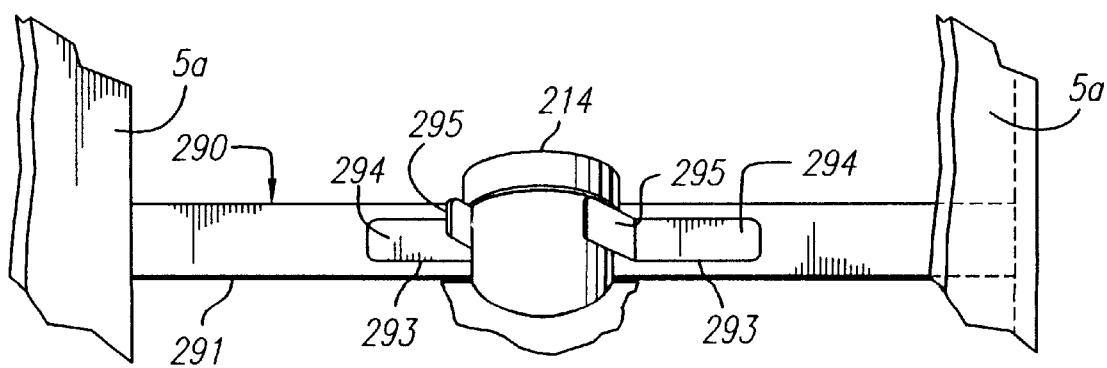
FIG. 11
FIG. 12

INSTALLATION METHOD FOR PIPE LAYOUT WITH OPPOSING INCLINE

CROSS-REFERENCE TO RELATED APPLICATIONS

This application is a continuation-in-part of U.S. patent application Ser. No. 08/936,331, filed Sep. 24, 1997 pending, which is further related to and claims priority from U.S. Ser. Nos. 08/829,827, filed Mar. 25, 1997, 29/077,027, filed Sep. 17, 1997, and 08/936,331, filed Sep. 24, 1997, all pending.

BACKGROUND OF THE INVENTION

1. Field of the Invention

The present invention relates to a pipe layout system for gasoline handling equipment, and more particularly, to a pipe layout system for service stations with secondary containment pipes and a system using a T-fitting for simplifying installation of primary and secondary pipelines and containment boxes, most particularly, where several dispensers have the same pipeline in common.

2. Background of the Invention

For some time now, gasoline handling equipment, such as gasoline dispensers, and the piping connecting such dispensers with underground gasoline tanks and pumps has been made with secondary containment. That is, due to environmental concerns favoring prevention of leaking gasoline from entering the ground, the pipes have a second pipe around them, and the dispensers and underground pump have a box-like structure below them. An example of such a box and secondary containment is shown in U.S. Pat. Nos. 5,285,829 and 5,341,857, both to the present inventor. Typically, for each product line, such as 87 octane, there is a separate pipeline. At the dispenser, there is an impact valve which will shut off the flow of gasoline to the dispenser in the event of a vehicle colliding with the gasoline dispenser or other disaster. The above-mentioned patents show that the impact valve may also be connected to a float mechanism for detecting leaking gasoline that is collected within the dispenser. The lifting of the float mechanism will shut off the impact valve. In addition, in such systems, it is common to provide a light, bell, or other warning signal, including the shutting off of the dispenser itself, to alert the station attendant that there is a problem with that dispenser. The float system will also detect water and will operate in the same manner as in response to gasoline.

In such systems, it is industry practice and often mandatory under the fire codes or pursuant to the fire marshal's request to have a mechanism to detect leaking gasoline in the primary pipeline, which then would get into the secondary pipeline or containment boxes. At each containment box, the secondary pipeline can either be left open, as the box itself provides secondary containment, or completely closed. However, if the line is left open, it cannot be pressure-tested. Typically, codes require that the secondary line be pressurized and hold a minimum pressure, e.g., 5 psi, for a minimum time. Therefore, the secondary containment line is either closed by means of a plug inside the containment box, or closed and connected all the way through the box. The latter structure is somewhat cumbersome.

Because of the leak detection requirement, the pipelines are inclined downward from the outermost dispenser with respect to the underground storage tank. A typical incline is one-eighth (⅛) inch per one foot of pipeline. A common distance between concrete islands center to center for each dispenser is about twenty (20) feet. The total vertical incline will be two and one-half (2½) inches over twenty (20) feet for a ⅛ inch per foot drop. Since the pipes incline from the underground tank to the last dispenser along a pipeline, when there are several dispensers served by one product line, there can be a very significant vertical drop in the line. This necessitates the use of a different size containment box under each dispenser. Therefore, if there are three (3) dispensers, there must be three (3) different depth boxes (or one depth with three different places for penetration of the pipeline depending under which dispenser it is installed). Typically, the highest box's penetration hole is eighteen (18) inches from the concrete of the island to the middle of the primary pipeline, as a minimum required by local regulators or agencies. The next deepest holes would then be two and one-half (2½) inches deeper, and the third deepest holes would be five (5) inches deeper. Therefore, the excavation for the deeper boxes is more cumbersome. This problem is exacerbated when service stations have more than three (3) dispensers. In fact, it is not uncommon at truck stops and the like to have about six (6) or seven (7) concrete islands. Therefore, the deepest boxes must be installed quite deep, as well as being custom-made, depending on the distance from center to center of each successive island. More importantly, a standard tank depth is about four (4) feet, but with six (6) dispensers the tank depth would have to be well deeper than four (4) feet. This would necessitate a major expense to lower the fuel tank. In a new installation, it is still expensive to excavate deeper for the tank, and certain local requirements may prohibit too deep a tank.

It should be noted that the float leak detection system of the above-mentioned patents could be used to detect a leak in the dispenser or pump pipeline, but the impact valve only shuts down the dispenser where the box is located. If the entire product line is shut down by turning off the pump in response to detection by a float mechanism in any given containment box, this will result in significant loss of customers and lost service. In fact, providing any kind of detection in a containment box which shuts down the pump for the entire line suffers from this problem.

There is also a problem that service station attendants or owners will often disconnect the float mechanism, particularly if the box has been poorly installed and water tends to get into the box setting off the float.

In such systems, it is customary to install the containment box. The box surrounds an impact valve which leads to the gasoline dispenser below which the box is installed. A primary pipeline (product line) will pass through the box carrying fuel from an underground storage tank to the gasoline dispenser above the box, and also to be carried to an additional dispenser. Accordingly a T element is needed within the box to connect an input line of the primary pipeline to the line leading to the impact valve and dispenser (gasoline dispenser input line), while allowing product to continue on to the next dispenser through a product output line.

In view of the above, there is a great need for a detection system which can shut down the primary (product) line, but only in response to leaks in the primary pipeline and not in response to water or a local leak within a containment box. In addition, there is a great need for avoiding excavating deeply and providing numerous types of boxes where, in particular, more than three dispensers are connected along one product line.

This creates a difficult situation to get access inside the box for installation or repair of a penetration fitting or a leading pipe, or components. What is needed is a way to simplify installation of the primary and secondary pipeline and fittings, and to simplify repair of same.

SUMMARY OF THE INVENTION

The present invention provides an installation method using a T-fitting for a leak detection system along with containment boxes which are only at two depths, or the apertures in the side thereof are only at two depths. In the system, there is what is referred to as a "shallow depth hole" (or shallow hole or box) and a "deep depth hole" (or deep hole or box). In the deep and shallow hole boxes, the secondary pipeline is sealed off at its end point located within the box. An opening is provided in a fitting around the secondary pipe, which opening communicates the area between the primary and secondary pipe with the inside of the containment box. The opening is oriented downward. A primary pipeline leak detection system includes piping connected to the hole which leads to a detection mechanism (e.g., a level sensor) separate and distinct from the float mechanism within the box. The detection mechanism is a closed system, and when gasoline gets into the system it flows to the sensor and actuates it. The sensor sets off a signal which shuts down the pump, and also preferably flashes a light, rings a bell, or makes another external signal, which may merely include the shutting down of the pump.

This primary pipeline leak detection system is located in the deep box. In a shallow box, the same kind of opening is provided in the secondary pipeline, but it is oriented upward and a hose with quick disconnect couplings and adaptor for connecting the openings in each secondary pipeline within the box is provided for pressure testing. Preferably, the hose is disconnected during normal operation of the system and stored to be used by repair mechanics or for testing. The deep and shallow boxes are alternated, so that piping always inclines downward from a shallow box to a deep box and then inclines back upward to the next shallow box. This alternating structure allows the use of two box depths only, or two different pipe hole locations in one standard depth box. Therefore, regardless of how many dispensers are connected to a single product line, only two types of boxes will be needed.

The closed system also prevents water which leaks into the containment box, or gasoline that has leaked into the containment box, from being detected by the system which will shut down the entire product line.

The system also provides a fail-safe where a station owner or attendant might disconnect the float system in the box. In such a case, ground water or gasoline when it reaches a certain height will flow into the hole in the fitting of the secondary pipeline or in the secondary pipeline itself and flow down to a low box where, when detected, will shut down the product pump.

The present invention also provides a T-fitting such as for use inside a containment box for connecting a primary pipeline to a gasoline dispenser, the T-fitting having two flanges which connect to the pipeline and a main T element sealed to each flange by a sealing element such as a gasket. In a preferred embodiment, the flanges thread onto each end of the primary pipeline. The main T element has a stem which is threaded to a flexible pipeline leading to the gasoline dispenser. After threading the flanges, the main T element is held in alignment with the flanges, then the flanges are bolted to the main T element with a rubber gasket in between. Bolt holes in the T element are elongated. The main T element and the flanges have scores on their exteriors above the center of the bolt holes to enable them to be aligned.

To assist in threading the flanges into the primary pipe, there is a tool having a cross-shape and including a pin on each portion of the cross at 90° apart. The pins are inserted into the bolt holes on flanges and a handle of the tool is rotated to thread the flange.

To assist in centering the main T element, a tool having a long bar is dimensioned to extend to each side wall of the containment box. The tool has a pair of centering elements extending perpendicular to it and the stem of the main T element is positioned between them.

The invention is also a method by which the T-fitting is installed, the method including connecting a product input line with a gasoline dispenser and a product output line with a gasoline containment box using a T-fitting having a main body and first and second flanges. The method includes the steps of installing the input product line such that it has a free end extending into one side of the box, fixing the first flange of the T-assembly to the free end of the input product line, positioning an end of the output product line at a predetermined distance from the free end of the input product line, fixing the second flange of the T-assembly to the end of the output product line, connecting a gasoline dispenser input line to a stem of the main body of the T-assembly, positioning first and second ends of the main body of the T-assembly in alignment with the first and second flanges, respectively, and releasably connecting the ends of the main body of the T-assembly to the first and second flanges, respectively, whereby the T-assembly may be disconnected from and reconnected to the input and output product lines by disconnecting and reconnecting the ends of the main body of the T-assembly to the first and second flanges, respectively.

BRIEF DESCRIPTION OF THE DRAWINGS

FIG. 2 is a detailed vertical sectional view of a right-side connection of the supply pipeline and secondary pipeline taken along a line 2—2 of FIG. 1, shown for a deep box, the left-side view being a mirror image thereof;

FIG. 3 is a detailed perspective view of a primary pipeline leak detection system of FIG. 1 for a deep box;

FIG. 10 is a partial vertical sectional view of the T-element showing connection of a flange to a left side thereof, the element being symmetrical at left and right sides thereof;

FIG. 11 is an end view of a main body of the T-element;

FIG. 12 is an end view of a flange of the T-element engaged by a wrenching tool;

FIG. 15 is a sectional view taken along a line 15—15 of FIG. 1 showing a primary pipe, a spacer, and a secondary pipe.

DESCRIPTION OF THE PREFERRED EMBODIMENTS

Figure 1:
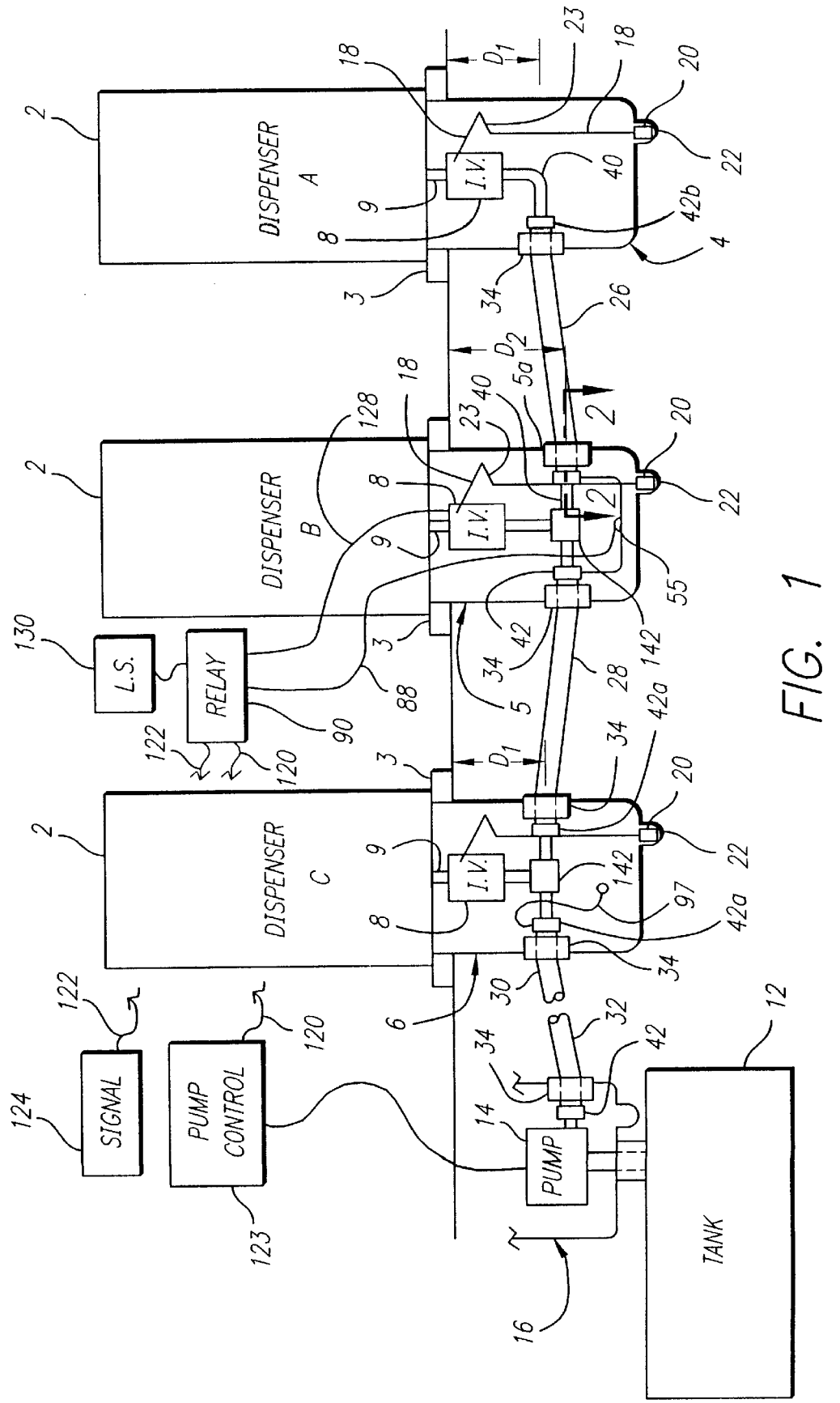
FIG. 1 is a schematic view of a service station showing a layout of dispensers, the underground tank, the underground pump, the product line and secondary containment system with a primary pipeline leak detection system, according to the invention.

FIG. 1 shows a service station with three (3) dispenser islands. As is typical in service stations today, each dispenser island may have three or more different types of dispensers, such as for 87 octane, 89 octane, 92 octane, and diesel fuel. Each dispenser 2 sits on an island 3 and has a secondary containment box 4, 5, 6 attached to its underside. The secondary containment box may be of a type such as in U.S. Pat. Nos. 4,971,225, 4,842,163, or 5,135,324, all to the present inventor, and all incorporated by reference herein. The boxes have impact valves (I.V.) 8 where fuel from a primary pipeline 40 passes through to each dispenser 2 via a connecting pipe 9. The primary pipeline, as is well known in the art, carries gasoline from an underground storage tank 12 to the impact valves and is pressurized by a submersible pump 14. The pump 14 is located in a sump box 16, which may be constructed similar to the containment boxes as it performs a similar leak collection function with an electronic shut down of the pump. As disclosed in the above-referenced three patents, each impact valve 8 is connected by a chain-and-lever mechanism 18 to a float 20 located, preferably, in a well 22 formed in each box. This structure applies equally to each containment box and sump 16, but is only shown for purposes of simplicity in box 5.

The impact valve will be shut off preventing the flow of fuel product to the dispenser in which it is located, if a sufficient amount of liquid collects in well 22 to move float 20 upward and pull on the chain connected to the impact valve by a lever mechanism 23, as explained more fully in the above-mentioned three patents.

Each secondary pipe 26, 28, 30, and 32 is sealed to a containment box wall, or the sump wall by means of a flexible penetration fitting, such as in U.S. patent application Ser. No. 08/714,471, filed Sep. 16, 1996, by the subject inventor and entitled FLEXIBLE PENETRATION FITTING, incorporated by reference herein. Each penetration fitting 34 may be identical and is constructed as shown in detail in FIG. 2.

FIG. 2 shows penetration fitting 34 attached to the right wall 5a of box 5, but the same structure positioned in mirror image works for attachment to the left wall of each box or sump. Primary pipeline 40 is shown passing through secondary pipeline 26. Primary pipeline 40 may actually consist of many pipes and fittings as is well known in the art. Secondary pipeline 26 is sealed to primary pipeline 40 inside the box by a fitting assembly 42. Penetration fitting 34 and fitting assembly 42 may also be used in sump box 16. A similar fitting to fitting assembly 42 is shown in U.S. Pat. Nos. 5,341,857 issued Aug. 30, 1994, and 5,285,829 issued Feb. 15, 1994, to the present inventor, incorporated by reference herein.

The fitting assembly 42 has a body 44 and a nut 46. A rubber or elastomeric deformable doughnut 48 is disposed between an inner wall of the nut 46 and an outwardly facing wall 44a of body 44. The body has an outwardly threaded surface 44b, onto which the nut threads. This compresses the deformable doughnut 48 and seals it against the primary pipe 40. Secondary pipe 26, after passing through an aperture in the wall 5a, fits around a notch 44c in the body 44. A suitable epoxy for the gasoline and underground environment may be used to fix primary pipe 26 to notched surface 44c of body 44.

Flexible penetration fitting 34 which seals the secondary pipe to the wall of the containment box, includes an elastic sleeve 52, which is bent, and a band clamp 54 to tighten the sleeve against the secondary pipe. In this construction, the band clamp also helps hold the secondary pipe against body 44 of the fitting. The elastic sleeve may be given some rigidity by a metal or other rigid ring 56. A nut 58 and bolt 60 press one end of the sleeve and an elastomeric ring 62 against each side of wall 5a to complete the seal.

Figure 4:
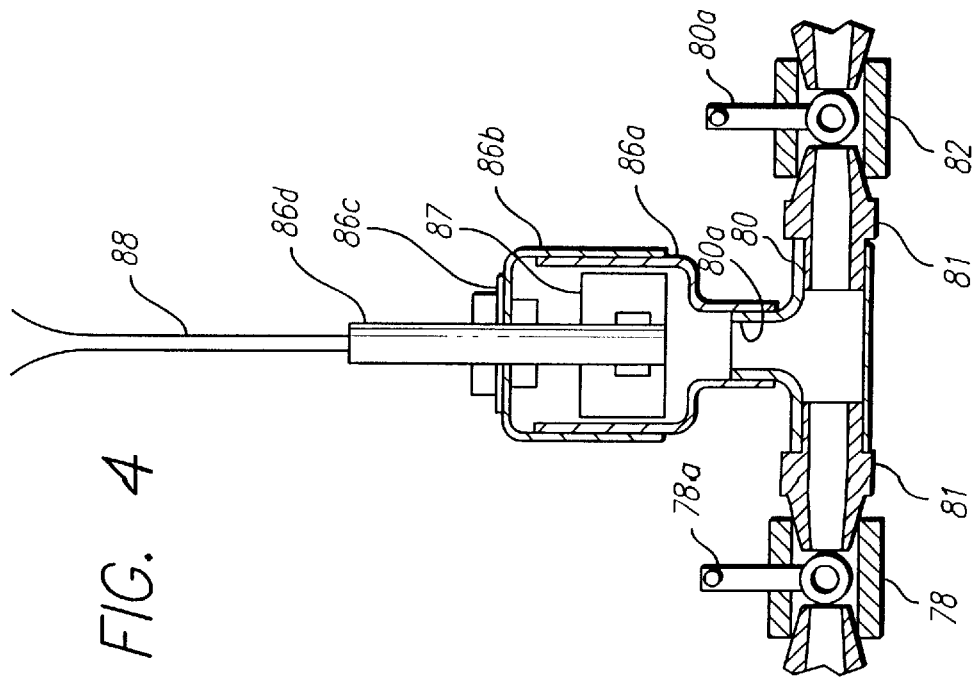
FIG. 4 is a detailed schematic view of a detection mechanism and its connection to valves of FIG. 3.

The body 44 of the fitting assembly 42 has an aperture 44d communicating the exterior of the fitting with its interior. This communicates the space formed between primary pipeline 40 and secondary pipe 26 with the interior of the containment box. The opening 44d is preferably threaded and is oriented in box 5 in a downward direction. A doubly threaded coupling member 64 threads into hole 44d and allows a nut 66 to couple the coupling member with the threaded end of a pipe 68, such as a copper or stainless steel pipe. Pipe 68 as shown in detail in FIG. 3 may itself be an elbow member, or may lead to an elbow member. Then, straight pipes 70, elbows 72, straight pipes 74 connect to a T-fitting 76 at each end thereof. The stem 76a of the T-fitting then connects directly or by means of further piping to a valve 78 having a valve handle 78a. The far side of valve 78 connects directly to one end of another T-fitting 80, or indirectly by means of further piping or a connector 81 (FIG. 4). A second valve 82, having a handle 82a, is connected to the other end of T-fitting 80 by another connector 81. A short open-ended segment of pipe 84 connects to the other side of second valve 82. The stem 80a of T-fitting 80 is directed upward and connects to the base of a level switch assembly 86. Such a level switch may be provided by a "Buna N Float," e.g., LS-1700 Series, such as manufactured by Gems. The level switch is shown schematically in FIG. 4 and may be electronic, magnetic, mechanical, or other suitable detection system. The switch has a bottom member 86a which couples to stem 80a. It also has a movable float member 87 which will move upward with the presence of liquid. As it moves upward, it will contact with or magnetically respond to an electrically conductive upper portion 86b and will, by virtue of closing the (magnetic, electrical or otherwise) coupling, send a signal through wiring 88 to a relay box 90 (FIG. 1). The level switch and valve assembly structure is identified by box 55 in FIGS. 1 and 3.

The switch top member 86b is connected to tubing 86d in which wire 88 is located. This tubing extends, e.g., for two (2) feet upward so that top member 86b can easily be removed and replaced by using the tube, for inspection by mechanics or the fire marshall. Top member 86b has an aperture 86c formed in it to allow for air flow. This hole also functions as a fail-safe in case the mechanical float system or level switch does not work. In addition, wires 88 may be looped at one point or otherwise held close together, so that in the event of a fire in the box, the wires will melt, cause a short, and stop the pump.

Figure 5:
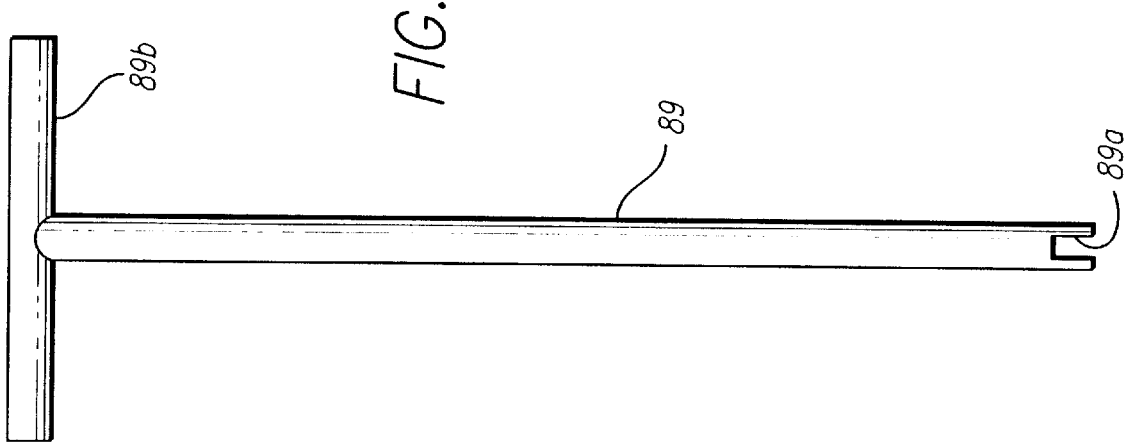
FIG. 5 is a side view of a tool for opening and closing the valves.

FIG. 5 shows a simple T-shaped tool 89 having a notch 89a in its base which allows its handle 89b to be turned while notch 89a engages whichever valve handle 78a, 80a the operator wants to open or close.

Figure 6:
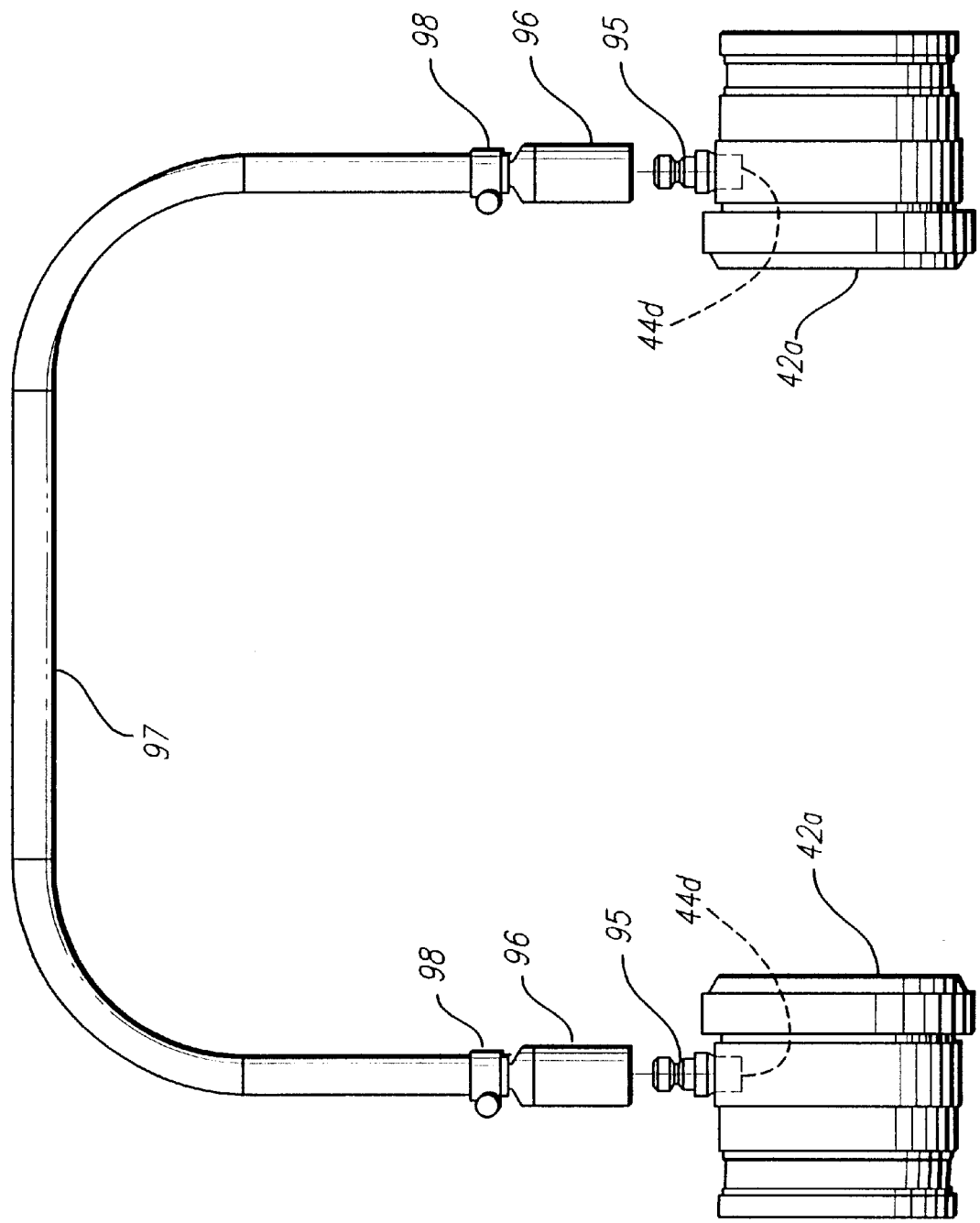
FIG. 6 is a side view of details of a jumper hose connection for a shallow box of FIG. 1.

The structure in a shallow box, containment box 6, is similar to deep box 5 except that there is no primary pipeline leak detection system. Rather, there is a compression test jumper system. The primary and secondary pipelines are constructed as in containment box 5, the only difference being that fitting 42a, which is identical to fitting 42, is preferably disposed so that aperture 44d is directed upward for convenience. In this direction, it may be readily used for the jumper system. Specifically, as shown in FIG. 6, threaded aperture 44d is directed upward for each fitting 42a. Aperture 44d receives an air hose plug fitting 95 threaded into it, to receive, e.g., by friction fit, a socket member 96. The plug and socket may be a quick disconnect hose coupling. Socket member 96 has a male end which faces upward and has a tube 97 band-clamped by clamps 98 to it. As in the structure within box 5, apertures 44d of fittings 42a communicate the space between the primary and secondary pipes with the inside of the box. The jumper hose 97, when connected to socket members 95, allows air to pass through the hose, thus closing the system for air pressure testing.

With the above structure, operation of the system will now be described.

The system is constructed so that the primary pipeline leak detection system will be in a containment box, such as box 5, that has its secondary piping ending at a low point while the secondary piping connected to adjacent boxes are located at higher points. This alternating of high and low points provides only two box types: depth D1 for a shallow box such as boxes 4 and 6 and depth D2 for a deep box such as box 5 in FIG. 1. The points where the pipeline penetrates the walls of box 5 are lower in the box versus higher in shallow boxes 4, 6. In a typical installation, the shallowest depth from the top of the concrete island 3 to the center of the primary product line where the box is penetrated is eighteen (18) inches. In the deep box, this could be about twenty and one-half (20½) inches, given the distance from center to center between islands of twenty (20) feet with a one-eighth (⅛) inch per linear foot drop in the pipeline. Accordingly, no matter how many dispensers are connected to the same product line, and no matter how far apart dispensers are located, it is possible to have only two types of boxes, which need not get progressively deeper.

It should be noted that the boxes 4, 5 and 6 are shown as the same size, and the penetration points are shown at different heights in box 5 relative to boxes 4 and 6. However, box 5 could be made deeper than boxes 4 and 6, and have penetration points at the same absolute depth as in the current embodiment.

Figure 7:
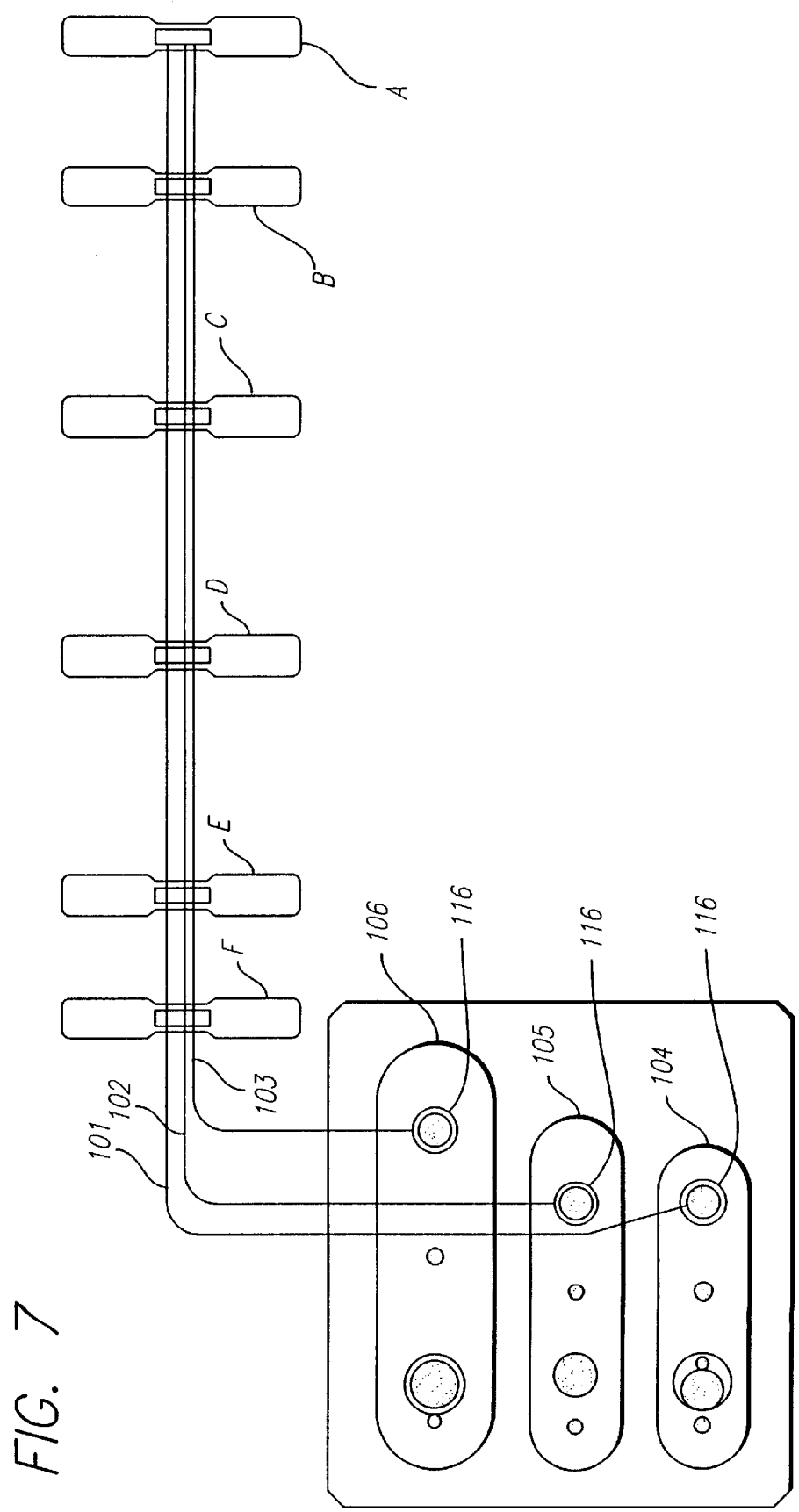
FIG. 7 is a schematic view of a pipeline layout for a service station in accordance with the invention.

FIG. 7 shows a layout with more than three dispensers, i.e., six dispensers A through F in line. There are three product lines 101, 102, 103, from tanks 104, 105, 106, respectively. The end dispenser A may have a containment box with the structure such as that shown in FIG. 1, and may be a shallow box. The only difference between this box and shallow box 6 is that it has a pipeline extending only through one end and thus primary pipeline 40 does not require a T-element between it and impact valve 8. Dispenser B would have a deep box such as box 5 below it. Dispenser C has a high box, such as box 6, below it. Dispenser D has a deep box such as box 5. Dispenser E has a shallow box such as box 6. Dispenser F has a deep box such as box 5. The sump 116 where the pump is located can be even deeper than the deep box, as is sump 16 in FIG. 1. Regardless of how many dispensers are provided along a single product line, the containment boxes need only have two penetration hole depths.

The depth of the above-mentioned penetration holes and boxes will vary depending upon the slope or landscaping of the station.

Figure 8:
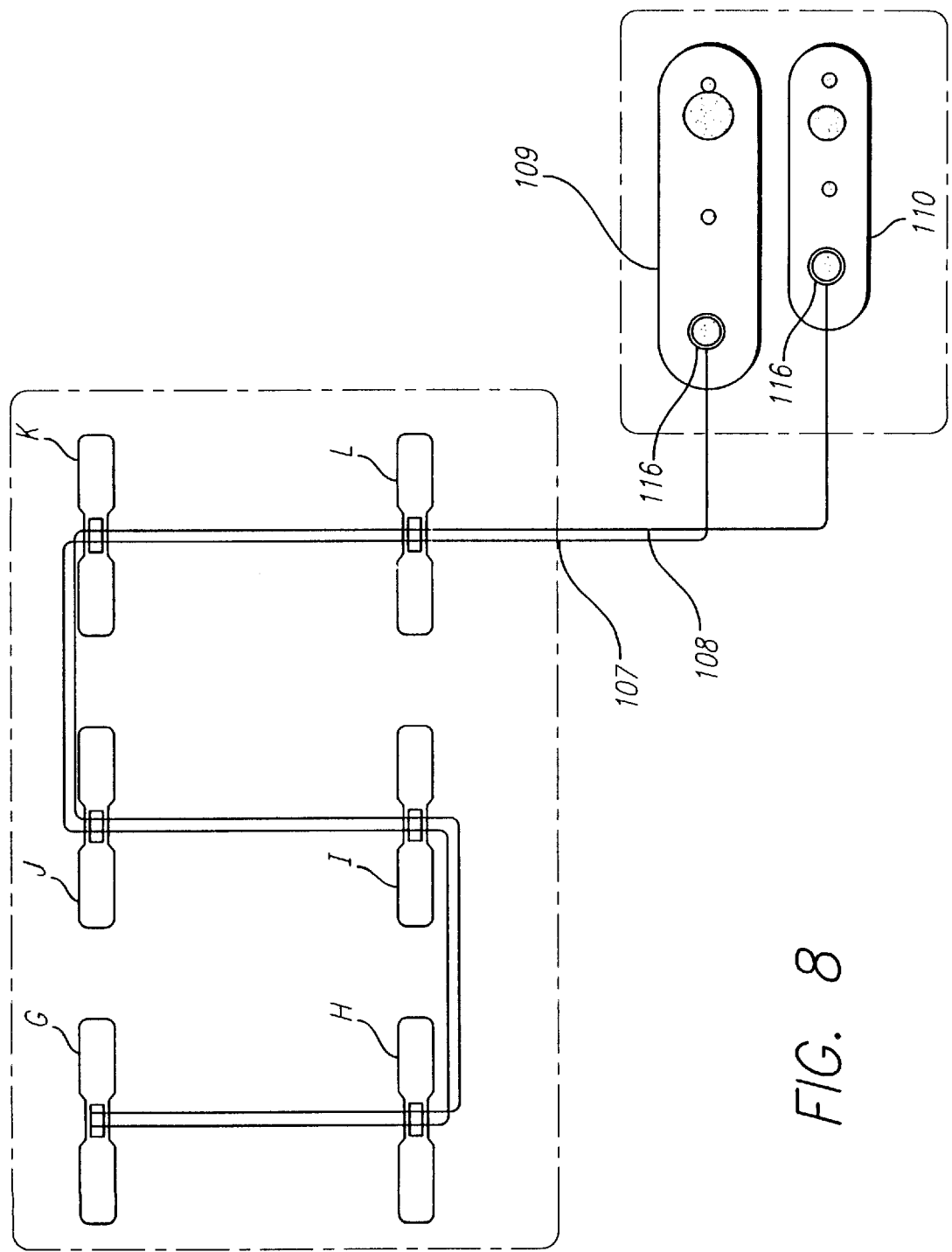
FIG. 8 is a schematic view of an alternative layout to that of FIG. 7.

FIG. 8 shows primary product lines 107 and 108 from tanks 109 and 110, respectively. These pipelines have dispensers G through L along them. The containment box below dispenser G may be like box 4 of FIG. 1. The boxes below dispensers H, J, L may be like box 5. The boxes below dispensers I and K may be like box 6. Box G is like box 4. Again, no matter how many containment boxes are provided along a product line, their penetration hole depth need only be at two levels. This makes it easy to make boxes of overall uniform dimensions, only the penetration hole position being varied, and only varied in two ways.

Returning to FIGS. 1, 4, and 6, leak detection occurs as follows: During normal operation of the system, jumper hose 97 is disconnected from at least one end or both. This allows any leaking gasoline to readily flow if located between the primary and secondary pipeline. In addition, it provides a fail-safe system as described later. Valve 78 is normally open and release valve 82 is normally closed. If there is a leak in the primary pipeline anywhere between right-fitting 42a in box 6 and left-fitting 42 in box 5, or right-fitting 42 in box 5 and fitting 42b in box 4, the gasoline will flow down through the opening in lower fittings 42 into the primary pipeline leak detection system and with a relatively small amount will actuate level switch 86. Wires 88 will signal the relay box 90 and a signal will be sent along wire 120 to pump control 123 for the product line along which the primary pipeline leak detection system 55 is installed. This signal will shut off pump 14 for that line. FIG. 1 shows lines 120 and 122 which may be connected directly to main signal box 124 and pump control 123, or indirectly by connecting in series to each relay box at each dispenser along the same product line for ease of installation.

In addition, the signal may be sent along wire 120 or along another wire 122 to main signal box 124, which may be a flashing light, bell, alarm, or other signal, which will alert the station operator that the primary pipeline has been shut down due to a leak detection. Since this system is closed, water or gasoline leaking in any particular containment box will not cause pump control 123 to shut down. It should be noted that if the standard float mechanism in box 5 is actuated, a signal will be sent along wire 128 to relay box 90 to actuate a local signal 130. This will alert the station operator that there is a leak within that particular box. This local signal can also be used when the primary pipeline leak detection system causes the pump control to shut down, or a separate local signal box may be used, to indicate the particular containment box where the primary pipeline leak detection system has detected a leak. This will narrow down the location of the leak in the primary pipe.

A similar primary pipeline leak detection system may also be placed in the sump 16, using just one fitting 42 connected to a level switch, but typically the float mechanism within a well formed in the sump will be connected to the pump control. There can also be a local signal in addition to actuating signal 124 or in place of it to indicate gasoline within the sump. Water getting into the sump is usually not as big a concern as in the containment boxes because the sump is normally sealed with a watertight cover. Such a watertight cover is described in U.S. Pat. No. 5,474,396 issued to the present inventor.

After gasoline has set off the primary pipeline leak detection system, release valve 82 may be opened to drain the gasoline and then closed to ready the system for future detection. As mentioned above, leaving the jumper hose open at at least one end, if not both, provides a fail-safe in case, for example, the float mechanism is disconnected in a high box. Gasoline will enter aperture 44d in fitting 42a and flow downward in the same way as if there were a leak in the primary pipeline. This will shut down the system and the leak can then be spotted. The box may also be drained at that point. As fitting 42b can also be constructed with a hole 44d, it too will provide this fail-safe function.

When pressure-testing the system, the jumper hose is connected in the high (shallow) box between the two fittings 42a, an identical fitting may be used in the sump in place of fitting 42 and may have a pressure gauge attached to it, and the line may be tested at fitting 42b. Alternatively, fitting 42b may have a pressure gauge and the line may be tested at the fitting in the sump. Numerous variations are possible. It should be noted that during pressure-testing, valve 78 leading to the level switch should be closed.

Finally, a suitable T-fitting 142 of FIG. 1 in boxes 5 and 6 is well-known in the art or an inventive T-fitting 142' used in a below disclosed embodiment of the invention. Primary pipeline 40 may be connected directly to it or by means of other kinds of fittings.

In accordance with another embodiment of the invention, a method for installing the pipeline is disclosed. The method is particularly applicable to a service station which has multiple dispenser islands. As is typical in service stations today and as in U.S. patent application Ser. No. 08/829,827, filed Mar. 25, 1997, incorporated by reference herein, each dispenser island may have three or more different types of dispensers, such as for 87 octane, 89 octane, 92 octane, and diesel fuel. Each dispenser sits on a concrete island and has a secondary containment box attached to its underside.

The primary pipeline, as is well known in the art, carries gasoline from an underground storage tank to the impact valves and is pressurized by a submersible pump. The pump is located in a sump box, which may be constructed similar to the containment boxes as it performs a similar leak collection function with an electronic shut down of the pump in response to a leak.

Figure 9:
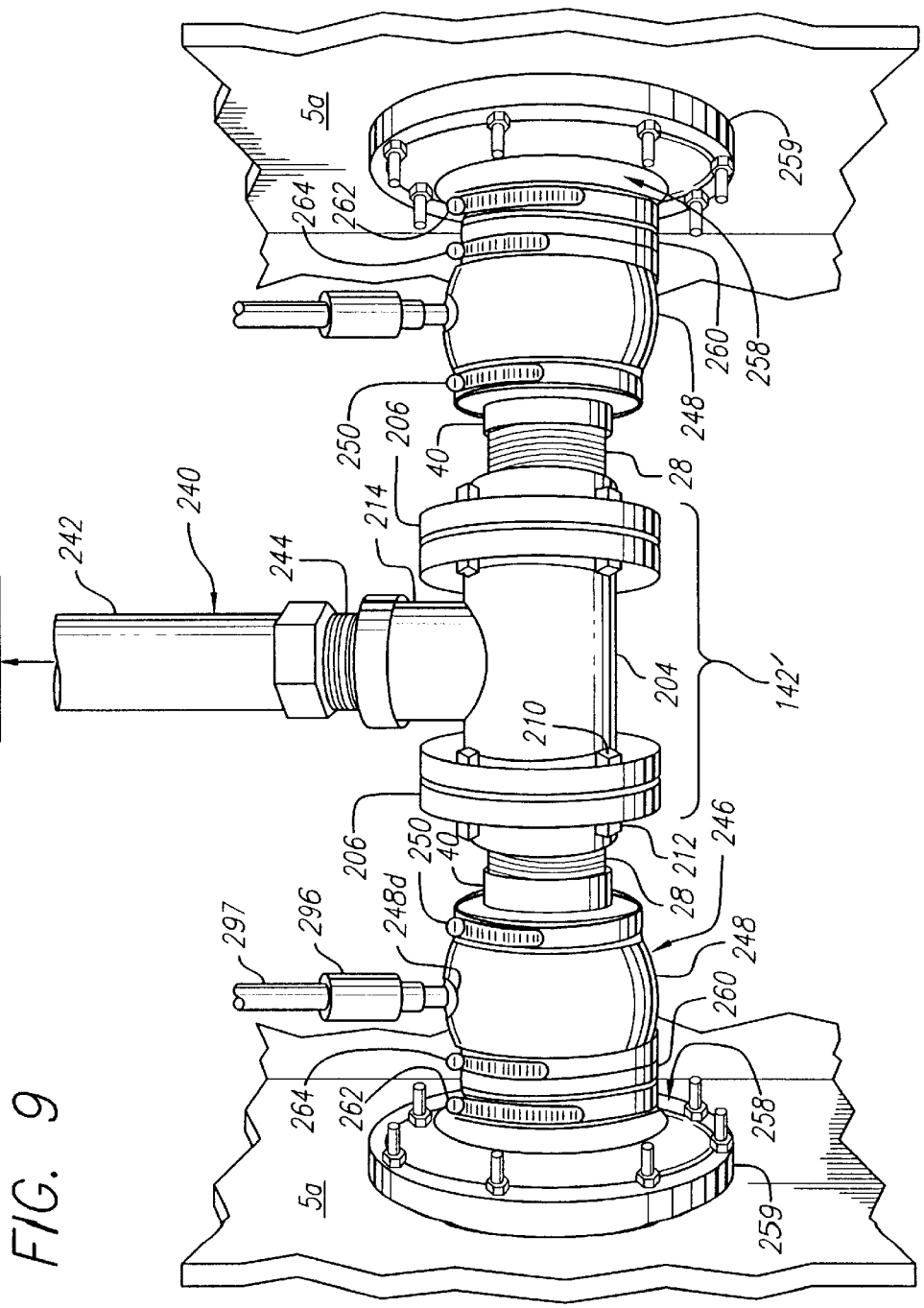
FIG. 9 is a slight perspective view of a T-element with its flanges connected to a product line and its stem connected to a pipe leading to a gasoline dispenser, the element being located within a containment box, according to the invention.
Figure 13:
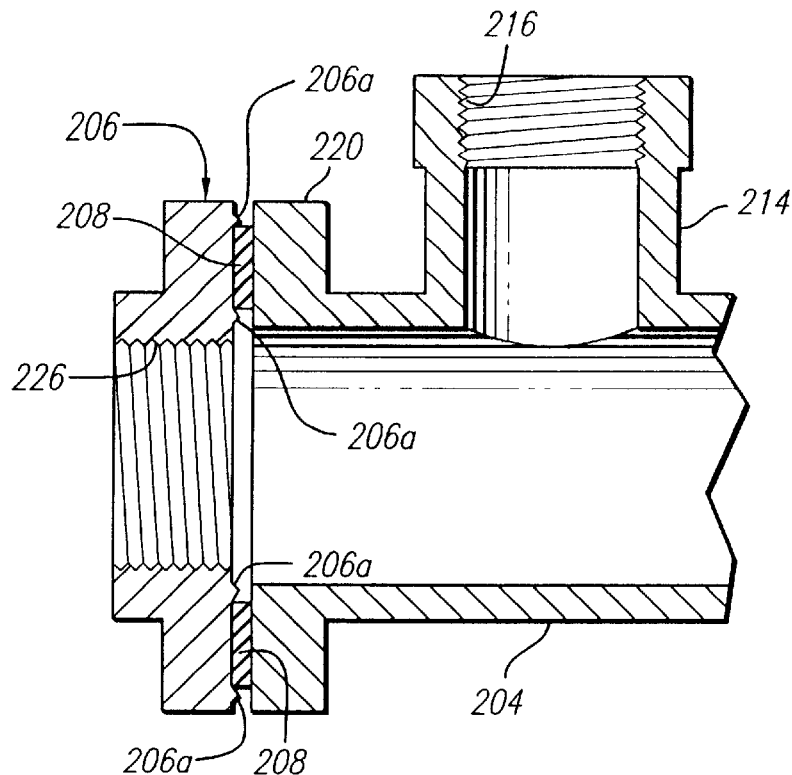
FIG. 13 is a slight perspective view of a stem portion of the main body and a centering tool extending between side walls of the containment box and engaging the stem.

FIG. 9 shows a partial view of walls 5a of a containment box (such as that of FIG. 1) and structure therein including a T-fitting 142' in accordance with a preferred embodiment of the invention. T-fitting 142' connects at its upper, stem portion 214 to a pipe 20 such as a flexible pipe having a flexible body 242 and a threaded end 244 similar to the first embodiment.

Each secondary pipe is sealed to wall 5a by means of a flexible penetration fitting 258, such as in U.S. patent application Ser. No. 08/714,471, mentioned above. Each penetration fitting 258 is preferably identical and may be constructed like the fitting 34 of FIG. 1. The secondary pipe (e.g., pipe 25 of FIG. 1) is secured to a portion 260 of the fitting 258 by at least one of band clamps 262, 264 and glue or epoxy. Another flexible fitting 246 may be band clamped by clamp 250 to a primary pipe 40. A body 248 of the fitting 246 may then be secured to the end of the secondary pipe or the fitting 258 by epoxy or clamping or both. The body 248 has a threaded hole 252 for attachment of a coupling element 256 having a tube 254 connected thereto. This hole 252 in body 248 will be used in the same way as described above and in U.S. patent application Ser. No. 08/829,827 mentioned above, for detecting leaks in and testing the secondary line.

Figure 14:
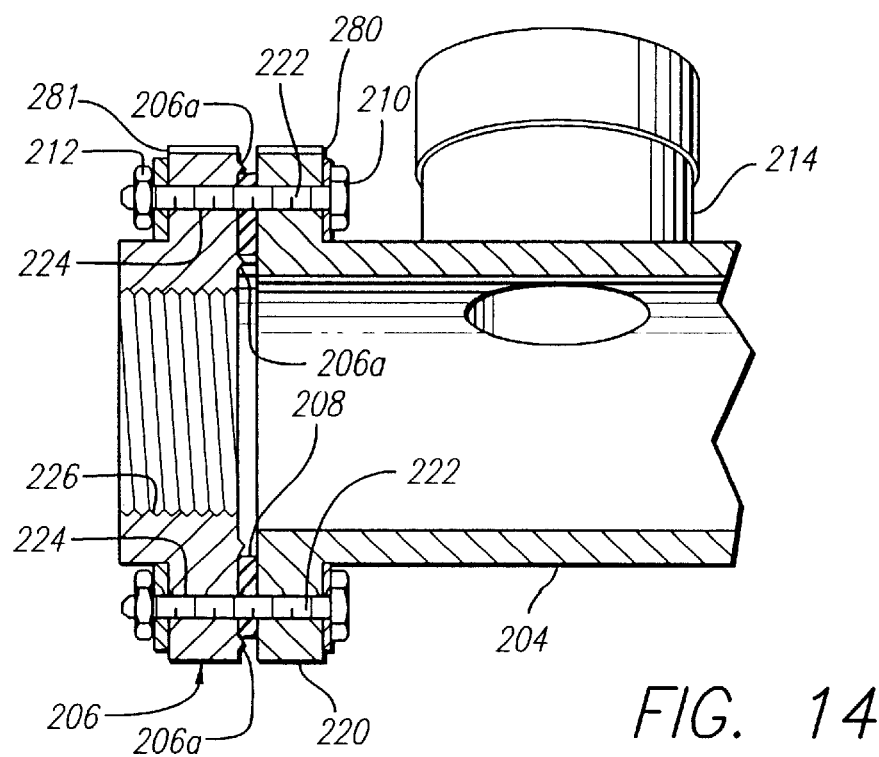
FIG. 14 is a view similar to FIG. 10 but the section is taken at 45° to the vertical section of FIG. 10.

With reference to the section view of FIGS. 10 and 14 which are taken at 45° apart, main T body 204 has a stem 214 with internal threads 216 for connection to the pipe 242 leading to the impact valve such as impact valve 8 of FIG. 1. Two flanges 206 connect to each opposing end of main body 204 with a rubber gasket 208 therebetween. The opposing ends of main body 204 have externally directed annular, planar lips 220 with bolt holes 222 preferably located at every 90°. In the embodiment shown, the bolt holes are preferably offset by 45° from horizontal and vertical orientations.

A bolt 210 and nut 212 fasten lip 220 to flanges 206 via bolt holes 222, 224. Internal threads 226 of flanges 206 allow the flanges to be threaded onto the external threads 28 of primary pipe 40.

To install the piping and T, and other fittings in the field, the following procedure may be used. An appropriate area below each dispenser island is excavated and containment boxes such as boxes 4, 5 and 6 are installed. Fittings 258 and 246 may be made in one piece (or separately) and attached at flat portion 259 to the inner wall 5a of the box, such as shown in FIG. 9. This may be done before or after installation of the box in the field. It is preferable to start the installation with an end box, e.g., box 4 of FIG. 1, where the primary pipeline and secondary pipeline terminate. The user measures from the face of the 90° or elbow fitting 40a used in end box 4 to the point where primary pipeline 40 is to be connected to the face of the flange of the T-fitting. (For example, the right side of assembly 142 of FIG. 1 which would be at flange 206 in FIG. 9). This gives the length of primary pipeline 40 segment, which may be fiberglass pipe formed in solid pieces and made, e.g., by A. O. Smith or Ameron. The secondary pipeline segment 26 is cut to a length corresponding to the distance between end box 4 and the next box 5 (at wall 5a in FIGS. 1 and 9), then add a sufficient amount for secondary pipe 26 to extend approximately one inch beyond the flexible penetration fitting 34 of FIGS. 1 and 2 or 258 in FIG. 9 attached to wall 5a and one inch beyond the same fitting 34 (or 258) which would be used inside the wall of end box 4. To facilitate sliding and rotating primary pipe 40 within secondary pipe 26 for purposes of performing the connection, and to help maintain the primary pipe centered in the secondary pipe, a C-clamp 275 or equivalent centering device is used. Such a C-clamp would be formed, for example, by a C-shaped portion of preferably somewhat greater than 180° of a hard plastic, and having radial protrusions 275a, e.g., about 90° apart, which contact the inside of secondary pipe 26. The material should be fairly hard and compatible with a gasoline environment, but have sufficient flexibility so that the C can be formed with a diameter slightly smaller than that of the exterior of the primary pipe, and thereby clamp or press fit over the primary pipe. Multiple C members in multiple orientations around the primary pipe should be used.

Prior to connecting the secondary and primary pipe at the end box, the remote ends of the primary and secondary pipe should be slid into the box (box 5) adjacent end box 4. This will provide room to then slid the other ends of the primary and secondary pipes into end box 4. Primary pipe 40 can be then threaded into the end of elbow 40a in the end box 4. C-members 275 allow primary pipeline 40 to be rotated and translated within secondary pipeline 26 to perform this threading. Secondary pipe 26 may then be slid into position one inch inside penetration fitting 34 or 258 attached to the inside of end box 4. The reducer cap or fitting assembly 46 or 246 should be positioned over the end of the primary and secondary pipes before connecting the primary pipe in end box 4.

To assist in determining the length to cut pipe 40, use a centering tool 288 to center the T which has been first connected to flexible pipeline 242. The distance from the center of box 5 to the position where primary pipeline 40 is to be connected in end box 4 would then have the distance from the center of the T to the face of the flange deducted from it to obtain the length to cut the primary pipe. For the next box 6 and next primary pipe section 40, the distance between the center of each box 5, 6 is measured and one would deduct the length from the center of one T fitting 142 or 142' to the end face of the flange multiplied by two to represent this distance in each box.

Once end box 4 is fully connected, the right-side connections in the next adjacent box (box 5) of FIG. 1 in keeping with our example, would be connected. Before connecting, as in end box 4, fitting assembly 246 or reducer fitting 46 is slid over the primary pipe. The secondary pipe may at this time be connected to fitting 34 or 258. Right flange 206 is threaded to the end of primary pipeline 40. Through-holes 224 in flange 206 are aligned using alignment marks 280 with through-holes 222 in main body 204. The flexibility of pipe 40 if made of fiberglass is helpful in this regard. Rubber gasket 208 is placed between flange 206 and end 220 of the main body, and bolts 20 and nuts 212 are tightened.

The placement of primary pipe 40 and secondary pipe 28 located on the left side of box 5 in FIG. 1 is essentially the same. First, these pipes are slid into the next adjacent box 6 to a sufficient extent to allow them to be slid into the left end 5a of box 5. Then, fitting 46 (or 246) is slid over primary pipe 40. Flexible penetration fitting 34 or 258, previously attached to the wall 5a of the box 5, is then tightened to the secondary pipe 28, which would extend approximately one inch the end of the penetration fitting. The fitting 246, after pipe 28 positioned, is tightened. Glue ("pipe dope") may be used on the primary and secondary pipeline connection to the fittings.

The left flange 206 is then threaded to primary pipe 40. Pipe 40, which is still freely rotatable within secondary pipe 28, is then rotated so as to the align flange 206 and through-holes 224 with through-holes 222 in the end face of the main body. Rubber gasket 208 is placed in position and end flange 206 and end face 220 are bolted together. Fitting 46 or 246 may then be tightened to the pipelines. Connection of the primary and secondary pipes, fittings, and T member for each adjacent box (e.g., box 6) continues in the same way.

To thread flanges 206 of the T-member onto each primary pipe 40, and tighten them, wrenching tool 288 of FIG. 11 is useful. The tool includes a handle 288a and cross-portions 288b. Pins 290 are located on each cross-portion and the handle at 90° apart to match the spacing of holes 224. These pins 290 are positioned to enter holes 224 in the flange member. The flanges are tightened, preferably with their scoring 280 located approximately 45° from the vertical. Rubber gasket 208 is positioned in between concentric projections 206a of flanges 206. Main body 204 is then positioned with its scoring 280 substantially in alignment with scoring 281 on the flanges. Screw holes 222 in the main body are preferably elongated, as shown in FIG. 10, so that alignment need not be exact with holes 224 in the flanges.

The details of use of the centering tool at FIG. 12 will now be described. Before gluing and sealing the primary and secondary pipes to the fittings, the main T-member may be centered as shown in FIG. 12 using a centering tool 290. The tool has an elongate bar 291 dimensioned to extend between the side walls 5a of the box and having angle elements 293 fixed to it at their legs 294. Legs 295 project perpendicular from bar 291 and are at a distance apart slightly larger than the radius of stem 214 of main body 204 of the T. This centers or substantially centers the T-element and the final positioning of the secondary and primary pipes may be done at this point so that flanges 206 will be an appropriate distance from body 204. The primary and secondary pipes may then be fine positioned and epoxied and/or clamped to the fittings. Flanges 206 are then bolted to the main body of the T to seal it.

The T may be removed and later replaced for repairs or the like by unfastening the bolts and nuts, sliding the T out laterally, and then effecting the necessary repairs. The T may then be slid back into position and the bolts tightened again.

As noted above, the scoring is preferably located at about 45° from the vertical. On the main body of the T, there would be two scores 280 above the upper bolt holes. On the flange, there may be two or four scores 281 or other appropriate number at each bolt hole.

As shown in FIG. 10, stem 214 of the T has a thickened area 84 (which would be at the rear of the T in FIG. 1). This thickened area is for having a threaded hole formed therein. A normally closed valve may be threaded into the hole to allow for pressure testing of the T and primary pipeline.

It is understood by those skilled in the art that changes in the form and detail of the above-described embodiments may be made without departing from the spirit of the invention. For example, the positioning or amount of the scoring may be changed. The T-member may be made out of PVC, brass, or other suitable material, depending upon the environmental conditions. The primary pipeline may be flexible or rigid and the piping leading to the impact valve may be flexible or rigid.

It is understood by those skilled in the art that changes in the form and detail of the above-described embodiments may be made without departing from the spirit of the invention. For example, a level switch does not have to be used in the primary pipeline leak detection system. Another type of detector which can detect liquid or gasoline may be used in its place. Other structures for sealing the primary pipeline may be used. The threaded aperture need not be through the body of the fitting, but could be through a portion of the nut used to seal the primary pipeline, or even in the secondary pipeline itself, which would then be communicated with the pipeline leak detection system in accordance with the invention.

What I claim is:

1. A method of connecting a product input line with a gasoline dispenser and a product output line within a gasoline containment box using a T-assembly having a main body and first and second flanges, for installing a flammable fluids handling system, wherein there is a primary pipeline, a secondary pipeline around at least a portion of the primary pipeline, and at least first, second and third adjacent flammable fluids containment boxes located along the primary and secondary pipelines, the method comprising the steps of:

(a) installing the input product line such that it has a free end extending into one side of the first box;

(b) fixing the first flange of the T-assembly to the free end of the input product line;

(c) positioning an end of the output product line a predetermined distance from the free end of the input product line;

(d) fixing the second flange of the T-assembly to the end of the output product line;

(e) connecting a gasoline dispenser input line to a stem of the main body of the T-assembly;

(f) positioning first and second ends of the main body of the T-assembly in alignment with the first and second flanges, respectively; and (g) releasably connecting the ends of the main body of the T-assembly to the first and second flanges, respectively, (h) whereby the T-assembly may be disconnected from and reconnected to the input and output product lines by disconnecting and reconnecting the ends of the main body of the T-assembly to the first and second flanges, respectively.

2. The method of claim 1 wherein prior to the step of releasably connecting the ends of the main body of the T-assembly to the first and second flanges, there is a step of placing a gasket between the first and second ends of the main body and the first and second flanges, respectively, and in the step of releasably connecting, the gasket is releasably connected between the ends of the main body and the first and second flanges.

3. The method of claim 1 wherein the step of releasably connecting further comprises clamping the ends of the first and second flanges to the first and second ends of the main body, respectively.

4. The method of claim 1 wherein there are a plurality of through-holes in the periphery of the first and second flanges and a plurality of through-holes in the periphery of the first and second ends of the main body, and the step of releasably connecting comprises a step of bolting the periphery of each of the flanges to the periphery of each of the first and second ends of the main body using the through-holes.

5. The method of claim 4 wherein in the step of positioning the first and second ends of the main body in alignment with the first and second flanges, the through-holes in the periphery of the flanges are aligned with the through-holes in the periphery of the first and second ends of the main body.

6. The method of claim 5 wherein the aligning is performed using alignment markings on the first and second ends and on the first and second flanges.

7. The method of claim 1 wherein in the step of connecting the gasoline dispenser input line to the stem of the main body, the gasoline dispenser input line is a flexible pipe and the gasoline dispenser input line is flexed.

8. The method of claim 1 wherein the steps of fixing the flanges, the flanges are threaded to the input product line and output product line.

9. The method of claim 1 wherein in the step of installing the input product line, positioning one end of the input product line into the second box before moving the input product line's other end into the first box.

10. The method of claim 9 further comprising a step of positioning one end of the secondary pipeline inside the second box before moving the other end of the secondary pipeline into the first box, and fixing the secondary pipeline inside the first box.

11. In a flammable fluids handling system, wherein there is a primary pipeline, a secondary pipeline around at least a portion of the primary pipeline, and at least first, second and third adjacent flammable fluids containment boxes located along the primary and secondary pipelines, the improvement wherein the relative depth of the primary pipeline in the second box is at a second depth greater than the first, and the relative depth in the third box of the primary pipeline is less than the second depth, such that the primary pipeline and secondary pipeline are inclined downward from the first box and third box to the second box located therebetween, whereby the second box represents a gravitational low point of the primary pipeline and secondary pipeline for the first, second and third boxes, and further comprising:

a T-member comprising a main body having an inlet opening, an outlet opening, and a stem having means for connecting to the pipes a first flange fixed to the primary pipeline and a second flange fixed to the primary pipeline, a first seal member for sealing the first flange to the main body at the inlet opening of the main body and a second seal member for sealing the second flange to the main body at the outlet opening of the main body, and means for fixing the first and second seal members to the flanges and the main body at the inlet and outlet openings, respectively, whereby the flammable fluids supply pipeline will be carrying fluid through the containment box and will be communicated with the flammable fluids dispenser, and wherein the means for fixing releasably fixes the first and second seal members to the flanges and the main body.

12. The system of claim 11 wherein the T-member main body is internally threaded at the stem.

13. The system of claim 11 wherein the flanges are internally threaded for connection to the primary pipeline.

14. The system of claim 11 wherein the means for fixing comprises bolts and through-holes formed in the main body and flanges, and alignment marks for aligning the holes in the main body with the holes in the flanges.

15. The system of claim 11 wherein the member for sealing comprises a rubber ring for each flange, and each flange has concentrically formed projections for defining a space for receiving each rubber ring.

16. The system of claim 14 wherein the through-holes in the main body are elongated with respect to the through-holes in the flanges for providing alignment slack.

* * * * *